US007239723B1

(12) United States Patent
Al-Sheikh

(10) Patent No.: US 7,239,723 B1
(45) **Date of Patent: *Jul. 3, 2007**

(54) METHOD FOR VERIFYING THE IDENTITY OF A PASSENGER

(76) Inventor: Zaher Al-Sheikh, 33252 Breckenridge Dr., Sterling Heights, MI (US) 48310

(*) Notice: Subject to any disclaimer, the term of this patent is extended or adjusted under 35 U.S.C. 154(b) by 370 days.

This patent is subject to a terminal disclaimer.

(21) Appl. No.: 09/694,530

(22) Filed: Oct. 23, 2000

Related U.S. Application Data

(63) Continuation-in-part of application No. 09/016,099, filed on Jan. 30, 1998, now Pat. No. 6,137,895.

(60) Provisional application No. 60/060,187, filed on Oct. 1, 1997.

(51) Int. Cl.
*G06K 9/00* (2006.01)

(52) U.S. Cl. ..................................... 382/115; 382/118

(58) Field of Classification Search ............... 382/115, 382/100, 116–118, 128, 305; 235/375; 205/5
See application file for complete search history.

(56) References Cited

U.S. PATENT DOCUMENTS

| | | | | | |
|---|---|---|---|---|---|
| 3,258,277 | A | | 6/1966 | Schuster | 282/22 |
| 3,671,059 | A | | 6/1972 | Zeller | 283/7 |
| 3,755,935 | A | | 9/1973 | Annenberg | 40/2.2 |
| 3,758,970 | A | | 9/1973 | Annenberg | 40/2.2 |
| 4,001,073 | A | | 1/1977 | Jones et al. | 156/516 |
| 4,094,719 | A | | 6/1978 | Jones et al. | 156/250 |
| 4,507,166 | A | | 3/1985 | Posner | 156/235 |
| 4,865,351 | A | | 9/1989 | Smithson et al. | 283/58 |
| 5,139,847 | A | | 8/1992 | Breen | 428/40 |
| 5,272,025 | A | | 12/1993 | Wheeler | 430/14 |
| 5,421,619 | A | | 6/1995 | Dyball | 283/86 |
| 5,505,494 | A | | 4/1996 | Belluci et al. | 283/75 |
| 5,606,365 | A | | 2/1997 | Maurinus et al. | 348/222 |
| 5,920,053 | A | * | 7/1999 | DeBrouse | 235/375 |
| 6,108,636 | A | * | 8/2000 | Yap et al. | 705/5 |
| 6,137,895 | A | * | 10/2000 | Al-Sheikh | 382/115 |

OTHER PUBLICATIONS

Disability Plate, Placard or Disability Veteran Plate Information, http://www.state.ma.us/rmv/medical/plates_placs.htm.

* cited by examiner

Primary Examiner—Duy M. Dang
(74) *Attorney, Agent, or Firm*—Gifford, Krass, Sprinkle, Anderson & Citkowski, P.C.

(57) ABSTRACT

A conveyance boarding pass includes a human-cognizable image of a passenger as well as the travel itinerary details. The human-cognizable image is collected using a device capable of generating an electronic image at a time when the identification of the passenger is verified. Upon presenting the boarding pass the identity of the bearer is checked against the human-cognizable image on the boarding pass to maintain the security of the transport system. The electronic image optionally is stored in a computer database in combination with the travel itinerary details for further security and other uses.

3 Claims, 2 Drawing Sheets

METHOD FOR VERIFYING THE IDENTITY OF A PASSENGER

RELATED APPLICATIONS

This application is a continuation-in-part of application Ser. No. 09/016,099 filed Jan. 30, 1998, now U.S. Pat. No. 6,137,895 which claims priority of U.S. provisional application 60/060,187 filed Oct. 1, 1997.

FIELD OF THE INVENTION

This invention relates to a method for verifying the identity of a passenger, more particularly the invention involves printing a human-cognizable image of the passenger on a conveyance ticket so as to facilitate rapid and repeated security verification.

BACKGROUND OF THE INVENTION

Concerns over the ever-increasing sophistication of terrorism and drug trafficking have prompted transportation networks to utilize increased security procedures, in order to keep pace. Traditional security protocols dictate heightened security perimeters surrounding sensitive areas, as one approaches those areas. For example, the sensitive area of an airport is the aircraft itself. While runways and secure aircraft service areas are protected by a badge and uniform system by which only authorized personnel are permitted access to various secure areas, this system is not amenable to controlling aircraft access by passengers. Current security doctrine involves allowing access to airport terminals to the public upon passing a metal detector screening. Upon presenting a ticket and perhaps a form of photo-identification, a passenger is issued a boarding pass which designates the flight particulars of the passenger. The issuance of a boarding pass may occur on either side of the metal detection screening. The present system fails in that there are no means available to verify whether the passenger presenting a boarding pass upon gaining access to the aircraft, is in fact the passenger of record. In this way, the secure nature of the aircraft to only authorized passengers is compromised.

The weaknesses of the conventional security systems in regard to the presentation of a boarding pass by a person other than the passenger of record are not practically solved with existing methods. The addition of a passenger identification checkpoint using picture identification at the point of gateway embarkation is not feasible, owing to the time-consuming nature of a checkpoint. A checkpoint procedure under ideal conditions requires about thirty seconds per passenger and results in delays in loading the aircraft. This process is further slowed by passengers fumbling for picture identification stored in baggage, purses, wallets and the like. Thus, there exists a need for a method of verifying a passenger's identity at the time of boarding the transport that does not involve the use of a separate piece of picture identification.

Security at airports, passenger ships, train and bus stations, as well as other central transportation sites is a concern for all who utilize conveyances such as airplanes, trains and buses. Various systems are utilized to verify the identity of a passenger prior to boarding such a conveyance. For example, the identity of the passenger is typically verified at the time the ticket is purchased, at the time the boarding pass is issued or during passenger check-in. Because the identity of a passenger is not typically verified after the purchase of the ticket or after the issuance of the boarding pass, there is an opportunity for a ticket purchased by one passenger to be utilized by another passenger. Thus, there remains a need for a simple system which will permit the verification of the identity of a passenger at the time of boarding the particular conveyance.

SUMMARY OF THE PRESENT INVENTION

The present invention satisfies this need by providing a method for verifying the identity of a passenger at the time of boarding. The method includes the steps of initially verifying the identity of a passenger prior to the time of boarding. For example, the identity of the passenger may be verified at the travel agent or airline counter when the ticket is purchased and travel arrangements are made. Alternatively, the identity of the passenger may be verified upon check-in at the transportation site. Next, a photographic image of the passenger who has purchased the ticket is taken with a device capable of generating and outputting an electronic image. The photographic image is taken in a manner that prevents the passenger from changing places with another person following identity verification. A variety of digital cameras are available which enable an electronic image to be taken of an individual and which output an electronic image. The image is stored in a retrievable computer database. Illustratively, devices capable of generating an electronic image include charged coupled device (CCD) arrays and video analog camera/video frame grabber systems. It is appreciated that a relatively low quality image is sufficient for operation of the instant invention. For instance a 256 gray scale image renders comparison possible without consuming undue computer storage space. Higher quality images including color are also operative herein. In an alternate embodiment, a machine readable data series is encoded on the boarding pass as a bar code or magnetic strip. Upon reading and communication of the data series of a linked computer database, a human-cognizable passenger image appears on a computer display.

DETAILED DESCRIPTION OF THE INVENTION

The instant invention is discussed herein in reference to passenger aircraft transportation, not as a means of limitation, but rather is intended to be exemplary of the invention utility. One skilled in the art will readily appreciate the applicability of the instant invention to passenger identification in the transportation contexts illustratively including: cruise ships, ski-lifts, rail- and bus-lines.

Figure 2:
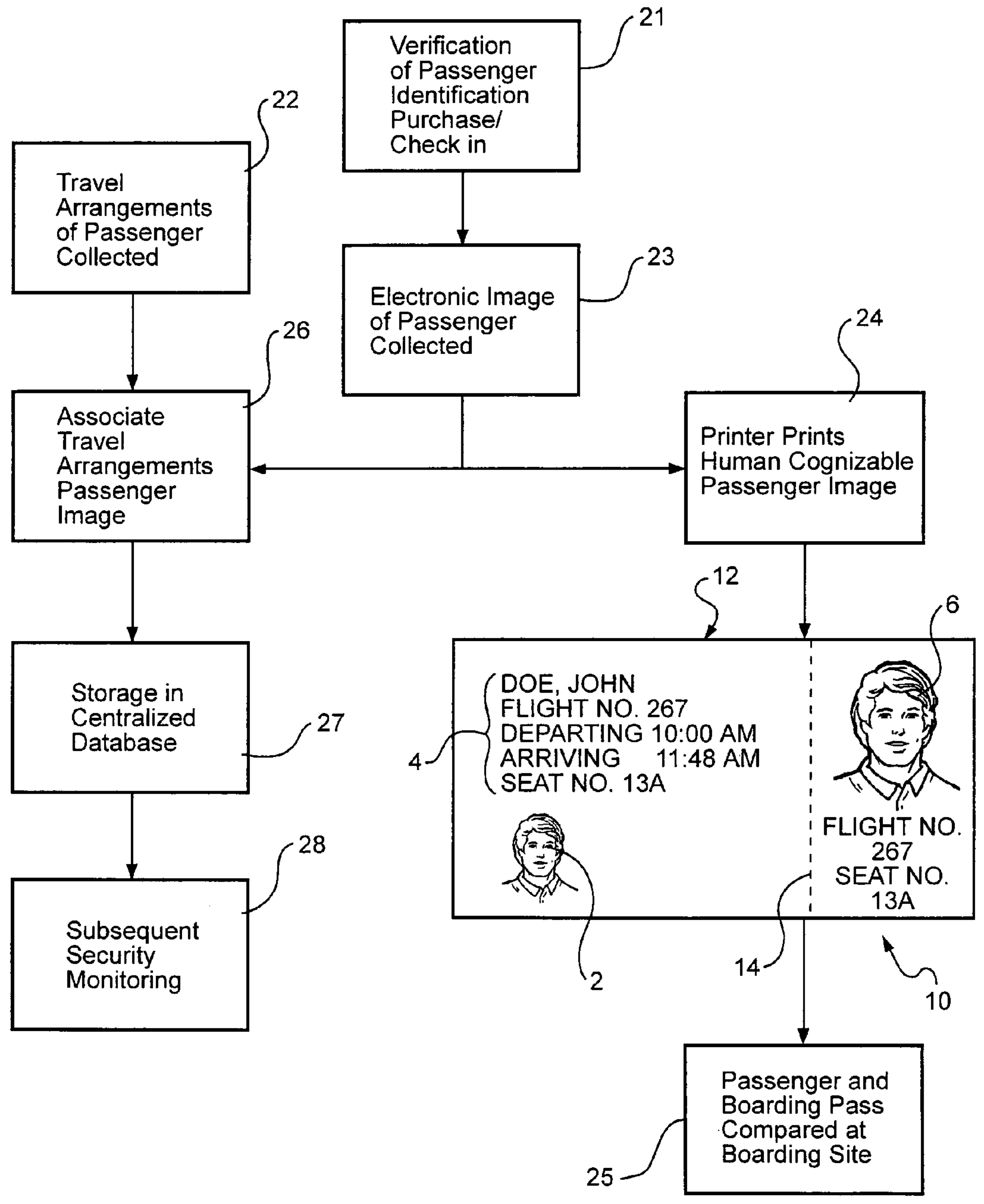
FIG. 2 depicts a flowchart of operative steps of an embodiment of the instant invention for verifying the identity of a passenger through the printing of a human-cognizable image on a boarding pass.

Upon purchase of a conveyance ticket or at the time travel arrangements are made, the identity of the passenger is verified and an electronic image of the purchasing passenger is taken, with a device capable of generating an electronic image. Alternatively, the passenger identity is verified 21 upon check in at the transportation site. Illustratively, devices capable of generating an electronic image 23 of FIG. 2 include charged coupled device (CCD) arrays and video analog camera/video frame grabber systems.

Figure 1:
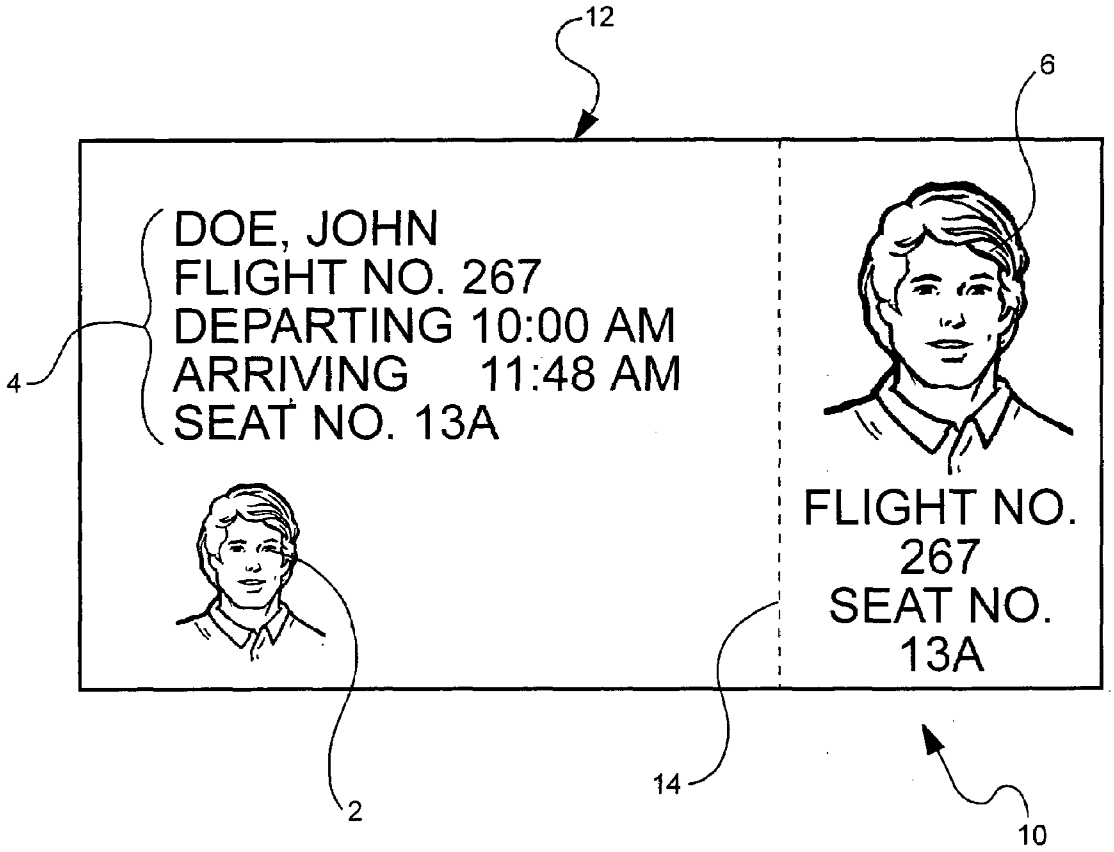
FIG. 1 depicts an embodiment of a conveyance ticket of the instant invention.

The electronic image is input to a printer which prints a human-cognizable image of the passenger 24 onto a boarding pass 10 which is depicted in FIG. 1. Any dissimilarity between the person requesting a boarding pass and the passenger of record thus becomes obvious to the issuing agent by visual comparison of the printed image 2 and the person requesting the pass. Upon a passenger presenting a conveyance ticket, a boarding pass of the instant invention is then issued. Owing to relatively low quality of the image 2, such as a 256 gray scale image, the printing of the human-cognizable image does not significantly decrease the speed at which an agent distributes passes. It is appreciated that a higher quality image in terms of gray scale tones or color is also operative herein. In printing a human-cognizable image onto a boarding pass, it is recognized that the ink is non-smudgeable to prevent obscuring the image through handling.

In an alternate embodiment, the human-cognizable passenger image is printed with an ink color, or alternatively a background color, that corresponds to a specific departure. Thus, an additional security mechanism is provided to assure that an individual passenger is boarding the correct departing aircraft. With a variety of ink colors and patterns, aircraft personnel are able to discern whether a given passenger is attempting to board their designated transport. The direct printing of a human-cognizable image onto a boarding pass thereby affords heretofore unavailable security measures. The passenger image is stored electronically within a computer storage. Preferably, the image is stored in any conventional image storage format within a central database.

The association of passenger image data within the central database and passenger travel data affords a transport agent the ability to verify passenger identity at the time of boarding independent of an actual boarding pass. Thus, a passenger appearing for transport departure absent a boarding pass and identification is granted transport access on the basis of accessing central database stored image and travel data. The present invention also affords advantages in the event of a catastrophic accident in speeding up the identification of dead and injured passengers. Preferably, the information on the travel itinerary 4 of the passenger is also printed onto the boarding pass at this time. It is further appreciated that a conveyance ticket itself is amenable to use as a substrate for the printing of a human-cognizable image of the instant invention, especially in instances where a boarding pass separate from the ticket is not issued.

An additional human-cognizable image 6 may be printed on the boarding pass, thus enabling an image to be printed on passes having several separable portions. The retention of a portion of the pass having the passenger's image thereon optionally allows for additional verification stages following boarding.

The boarding pass substrate 12 is generally composed of a semi-rigid rectilinear portion of paper or cardboard. Preferably, the substrate 12 has a perforation line 14 transecting the substrate. The substrate being printed with a blank conveyance form (not shown). The form is formatted to accept individualized travel itinerary details 4 of the passenger within blank sections thereof. The individualized travel datum illustratively including: passenger name, passenger destination, transport designation, departure time, arrival time, seat assignment, travel class, transport tariff and the like. In particular to aircraft transport the details may include flight number and meal selection information. A portion of the blank form being open for the printing of the human-cognizable image of the passenger.

The passenger then proceeds to the boarding site with the boarding pass. At the time of boarding, or upon arrival at the boarding site, the human-cognizable image on the boarding pass is compared with the passenger presenting the boarding pass 25 to ensure that the passenger who purchased the ticket is the same passenger who is boarding the conveyance.

The security of the transport is enhanced by passenger verification occurring at the time of boarding. The identity verification method of the instant invention is considerably quicker than that using picture identification because the verifying agent merely glances at the face of the passenger and their presented boarding pass.

In a preferred embodiment, the electronic image of the passenger is associated with the travel arrangements of the passenger 26 and stored in a centralized database 27. The database storage of a passenger image with travel arrangements provides for subsequent security monitoring 28 and for the tracking of criminal suspects traveling with counterfeit identification. Furthermore, image data coupled with travel itinerary data is optionally utilized outside of a security setting to provide demographic passenger information, for targeting transport promotional offers, and verification of non-transference of special fares and benefits extended to particular passengers.

In an alternative embodiment, the human-cognizable electronic image, and other individualized travel details, illustratively including: passenger name, passenger destination, departure time, arrival time, seat assignment, travel class, transport tariff, et al., are electronically associated to a unique alphanumeric code, printable in alphanumeric and in bar code format.

All pertinent text-based individualized travel details then are printed upon the boarding pass, along with the unique alphanumeric code, in alphanumeric and bar code format. Upon boarding, or at any other prior or subsequent security checkpoint, the bar code is read with a bar code scanner, which then causes the individualized travel details to be referenced, and the human-cognizable digital image to be displayed upon a video screen interfaced with the bar code scanner at the security checkpoint. This image is then compared with the individual presenting the boarding pass.

The unique alphanumeric code also is provided in alphanumeric format to enable manual entry of the code in the event of difficulty reading the printed bar code. It is appreciated that the alphanumeric and bar code formatted information is optionally printed in duplicate on separable portions of the boarding pass.

In an alternate embodiment, all pertinent text based individual travel details then are printed upon the boarding pass along with a machine readable data series in the form of a magnetic strip. The magnetic strip encoding the unique alphanumeric code. Upon boarding, or at any other prior or subsequent security checkpoint, the magnetic strip is passed through a machine reader thereby causing the individualized travel details to be referenced and the human-cognizable digital image of the passenger to be displayed on a video display interfaced with the magnetic strip reader at the security checkpoint. The video display image is then compared with the individual presenting the boarding pass.

In still another embodiment, the camera taking the image of the passenger may directly apply the image to the boarding pass by using either photosensitive material in at least a portion of the boarding pass in a Polaroid-type system or by directly transferring the electronic image created by a digital camera to the boarding pass.

One skilled in the art will readily appreciate that the present invention is well adapted to carry out the objects and provide the applications mentioned, as well as those inherent therein. Modifications and variations within the spirit of the invention will occur to those skilled in the art. Such modifications are also intended to fall within the scope of the appended claims.

What is claimed is:

1. A process for encoding a boarding pass with an image of a passenger, comprising the steps of:

verifying the identity of the passenger prior to a time of boarding and at a location beyond a security perimeter;

taking an electronic image of the passenger with a camera capable of generating a computer-storage image output;

printing a human-cognizable image of the passenger directly onto said boarding pass;

associating said computer-storable image output with an individualized travel datum of the passenger;

storing said computer-storage image output associated with said electronic image in a centralized database; and retrieving said computer-storage image output as said human-cognizable image on a video display in response to entry of an individualized travel datum of the passenger into a computer in communication with said centralized database to facilitate identity verification of the passenger at the time of boarding.

2. The process of claim 1 wherein printing said human-cognizable image occurs with a non-smudgeable ink.

3. A process for encoding a boarding pass with an image of a passenger, comprising the steps of:

verifying the identity of the passenger prior to a time of boarding;

taking an electronic image of the passenger with a camera capable of generating a computer-storable image output;

encoding a machine readable data series selected from the group consisting of: bar code and magnetic strip onto a boarding pass, said data series referencing said computer-storable image output within a computer independent of a human cognizable image of the passenger on said boarding pass;

reading the data series from said boarding pass to said computer database;

recalling a human-cognizable image of the passenger from said computer-storable image output, said computer-storable image output referenced to said data series with said computer database;

displaying said human-cognizable image on a video display interfaced with said computer database; and comparing the human-cognizable image on said video display with the passenger presenting said boarding pass at the time of boarding to facilitate identity verification of the passenger at the time of boarding.

* * * * *

US007239723C1

(12) EX PARTE REEXAMINATION CERTIFICATE (7423rd)

United States Patent

Al-Sheikh

(10) Number: US 7,239,723 C1

(45) Certificate Issued: Mar. 23, 2010

(54) METHOD FOR VERIFYING THE IDENTITY OF A PASSENGER

(75) Inventor: Zaher Al-Sheikh, Sterling Heights, MI (US)

(73) Assignee: Travel Photo, LLC, Warren, MI (US)

Reexamination Request:
No. 90/010,277, Oct. 23, 2008

Reexamination Certificate for:

| | |
|---|---|
| Patent No.: | **7,239,723** |
| Issued: | **Jul. 3, 2007** |
| Appl. No.: | **09/694,530** |
| Filed: | **Oct. 23, 2000** |

Related U.S. Application Data

(63) Continuation-in-part of application No. 09/016,099, filed on Jan. 30, 1998, now Pat. No. 6,137,895.

(60) Provisional application No. 60/060,817, filed on Oct. 1, 1997.

(51) Int. Cl.
*G06K 9/00* (2006.01)

(52) U.S. Cl. ....................................... 382/115; 382/118

(58) Field of Classification Search ........................ None
See application file for complete search history.

(56) References Cited

U.S. PATENT DOCUMENTS 6,158,658 A * 12/2000 Barclay ...................... 235/384
6,801,907 B1 10/2004 Zagami

OTHER PUBLICATIONS

Joanna Bremer, "Smooth Sailing With The A–Pass Card," Intele–Card News, May, 1999, United States.

Marco Commisso, "Smoother Sailing," South Florida Business Journal, Jlu. 24, 1998, United States.

* cited by examiner

*Primary Examiner*—Colin M Larose

(57) ABSTRACT

A conveyance boarding pass includes a human-cognizable image of a passenger as well as the travel itinerary details. The human-cognizable image is collected using a device capable of generating an electronic image at a time when the identification of the passenger is verified. Upon presenting the boarding pass the identity of the bearer is checked against the human-cognizable image on the boarding pass to maintain the security of the transport system. The electronic image optionally is stored in a computer database in combination with the travel itinerary details for further security and other uses.

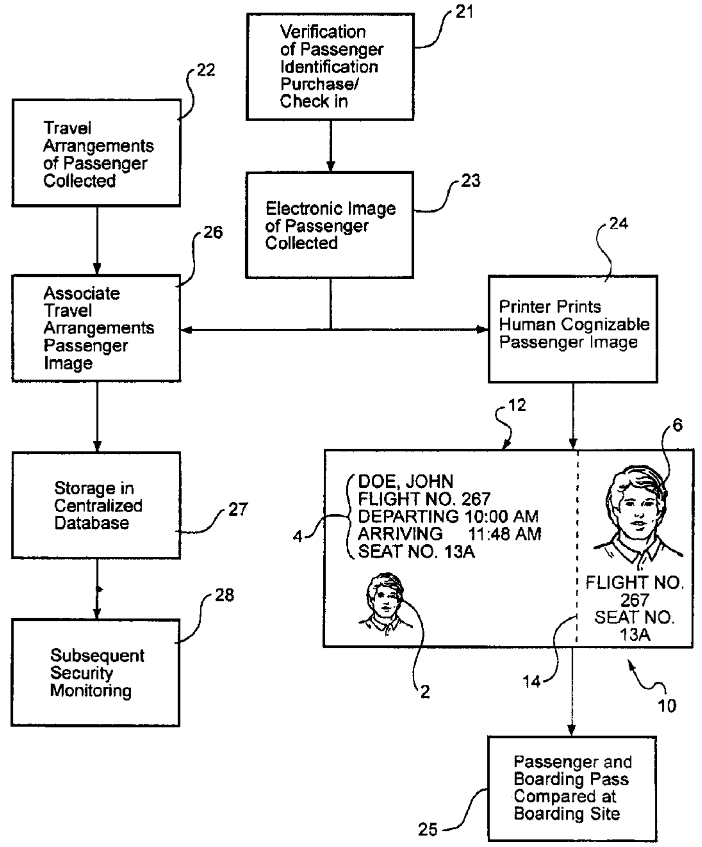

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 3 is determined to be patentable as amended.

Claims 1 and 2 were not reexamined.

3. A process for encoding a boarding pass with an image of a passenger, comprising the steps of:

verifying the identity of the passenger prior to a time of boarding;

taking an electronic image of the passenger with a camera capable of generating a computer-storable image output , *and generating a computer-storable image output*;

encoding a machine readable *bar code* data series [selected from the group consisting of: bar code and magnetic strip]onto a boarding pass, said data series referencing said computer-storable image output within a computer *database* independent of a human cognizable image of the passenger on said boarding pass;

reading the data series from said boarding pass to said computer database; recalling a human-cognizable image of the passenger from said computer-storable image output, said computer-storable image output referenced to said data series with said computer database;

displaying said human-cognizable image on a video display interfaced with said computer database; and comparing the human-cognizable image on said video display with the passenger presenting said boarding pass at the time of boarding to facilitate identity verification of the passenger at the time of boarding.

* * * * *